US007925422B2

(12) United States Patent
Hiramatsu

(10) Patent No.: US 7,925,422 B2
(45) Date of Patent: Apr. 12, 2011

(54) CONTROLLER OF INTERNAL COMBUSTION ENGINE

(75) Inventor: Hiromi Hiramatsu, Kariya (JP)

(73) Assignee: Denso Corporation, Kariya (JP)

( * ) Notice: Subject to any disclaimer, the term of this patent is extended or adjusted under 35 U.S.C. 154(b) by 629 days.

(21) Appl. No.: 11/933,542

(22) Filed: Nov. 1, 2007

(65) Prior Publication Data

US 2008/0208440 A1 Aug. 28, 2008

(30) Foreign Application Priority Data

Nov. 7, 2006 (JP) ................................ 2006-301053

(51) Int. Cl.
*G06F 19/00* (2006.01)

(52) U.S. Cl. ................ 701/113; 123/179.1; 123/179.16; 123/145 A

(58) Field of Classification Search .................. 701/113, 701/115; 123/179.6, 179.16, 90.15, 198 DB, 123/145 A
See application file for complete search history.

(56) References Cited

U.S. PATENT DOCUMENTS 5,211,056 A * 5/1993 Takamoto et al. ......... 73/114.34
5,967,129 A * 10/1999 Yamashita et al. ........... 123/674
5,993,641 A * 11/1999 Okazaki et al. ............ 205/784.5
6,148,258 A * 11/2000 Boisvert et al. ................. 701/99
6,629,512 B2 * 10/2003 Iwatani et al. ............. 123/41.14
6,805,094 B2 * 10/2004 Hashimoto et al. ........... 123/396
6,906,288 B2 6/2005 Toedter et al.
7,002,106 B2 2/2006 Toedter et al.
7,707,992 B2 * 5/2010 VanDyne et al. ............. 123/435
2002/0005178 A1 * 1/2002 Iwatani et al. ............. 123/41.14
2002/0036192 A1 * 3/2002 Sato et al. ...................... 219/270
2005/0092287 A1 * 5/2005 Tozzi et al. ................... 123/305

FOREIGN PATENT DOCUMENTS

JP 58-222978 12/1983
JP 11-050892 2/1999
JP 11-082271 3/1999

* cited by examiner

*Primary Examiner* — John T Kwon

(74) *Attorney, Agent, or Firm* — Nixon & Vanderhye P.C.

(57) ABSTRACT

A glow plug is provided in a combustion chamber of a diesel engine. An ECU diagnoses existence or nonexistence of a disconnection abnormality of the glow plug through a controller. When there is an abnormality in the glow plug, processing for cutting fuel supply of an abnormal cylinder, processing for increasing fuel injection quantity of a normal cylinder, processing for delaying injection timing of the abnormal cylinder, or processing for delaying valve timing of an intake valve of the abnormal cylinder is performed. Thus, suitable startability of the engine can be ensured even when the abnormality occurs in the glow plug.

24 Claims, 7 Drawing Sheets

CONTROLLER OF INTERNAL COMBUSTION ENGINE

CROSS REFERENCE TO RELATED APPLICATION

This application is based on and incorporates herein by reference Japanese Patent Application No. 2006-301053 filed on Nov. 7, 2006.

BACKGROUND OF THE INVENTION

1. Field of the Invention

The present invention relates to a controller that controls an output of an internal combustion engine having a heat generating unit projecting into a combustion chamber 2. Description of Related Art This kind of controller is shown, for example, in Patent Document 1 (JP-A-H11-82271). The controller has an electrode for ion detection disposed at a tip end of a heat generating unit (glow plug) in a conductive manner with a heating element. The controller determines an existence or nonexistence of a disconnection abnormality of the glow plug based on whether a current flows between the ion detection electrode and an inner wall of a combustion chamber. Thus, the existence or nonexistence of the disconnection abnormality of the glow plug can be determined appropriately.

The above-described structure can detect the disconnection of the glow plug but cannot cope with the disconnection when the disconnection actually arises. That is, when the disconnection arises, there is a possibility that starting cannot be performed unless the glow plug is replaced. Even if the starting is possible, there is a possibility that black lead is discharged because of incomplete combustion.

SUMMARY OF THE INVENTION

It is an object of the present invention to provide a controller of an internal combustion engine capable of securing good startability even when an abnormality of a heat generating unit occurs.

According to an aspect of the present invention, a controller has a changing device that changes an operation mode of an actuator of an internal combustion engine to control a state quantity in a combustion chamber of the engine such that lowering of startability due to an abnormality in a heat generating unit is compensated on the occasion of starting of the engine if the abnormality is detected.

With the above-described structure, the state quantity in the combustion chamber can be changed by changing the operation mode of the actuator from a mode in the case of a normality with the changing device. Therefore, lowering of the startability due to the abnormality in the heat generating unit can be compensated, and the startability can be improved.

The state quantity is a fuel quantity, an air inflow quantity or temperature in the combustion chamber, for example.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
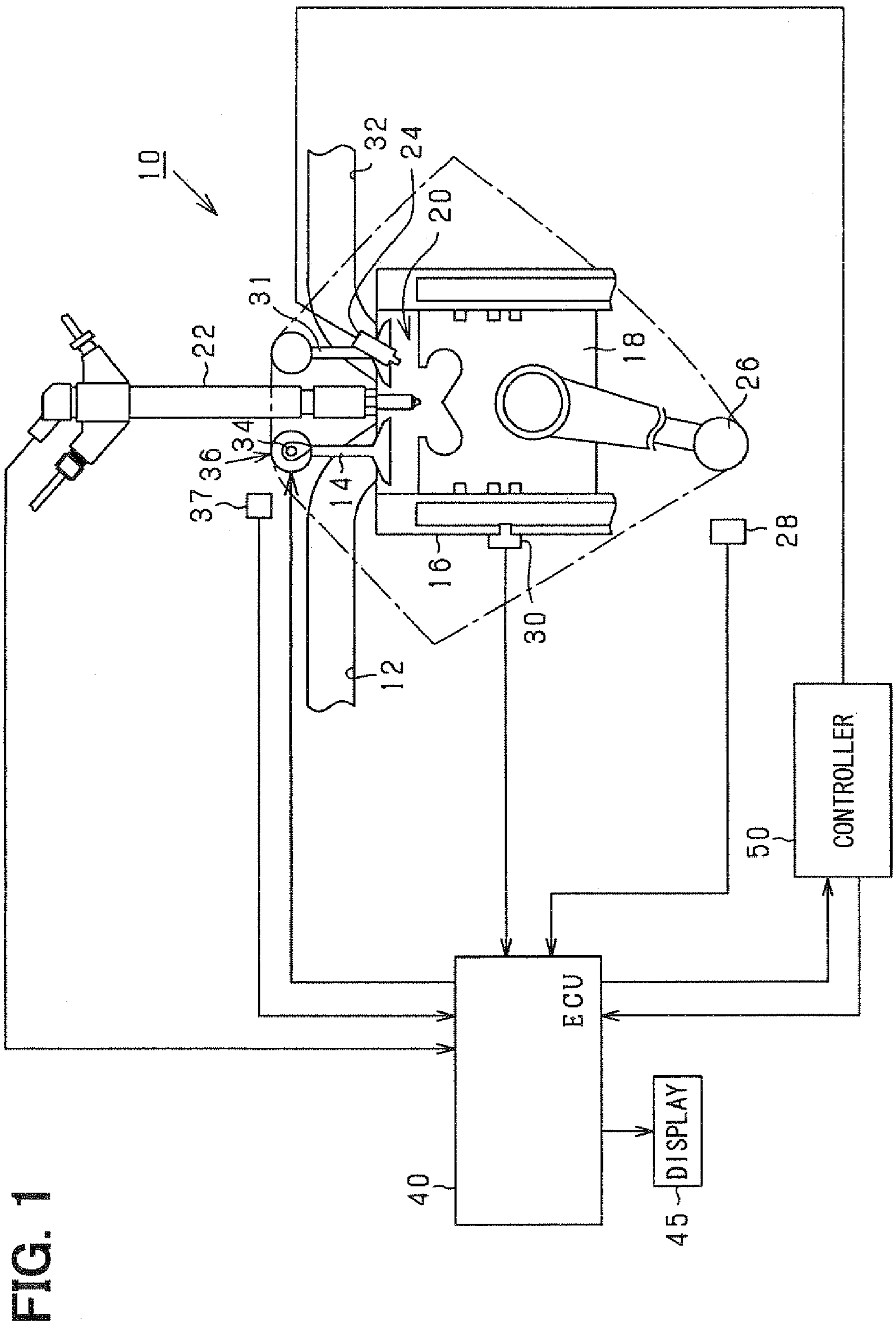
FIG. 1 is a structural diagram showing an engine system according to a first embodiment of the present invention.

Referring to FIG. 1, a controller of an internal combustion engine according to a first embodiment of the present invention applied to a controller of a vehicular diesel engine is illustrated. FIG. 1 is a structural diagram showing an engine system according to the present embodiment. As shown in FIG. 1 an intake passage 12 of the diesel engine 10 communicates with a combustion chamber 20 by an opening operation of an intake valve 14. The combustion chamber 20 is defined by a cylinder block 16 and a piston 18. A tip end portion of an injector 22 projects into the combustion chamber 20. Thus, injection supply of fuel to the combustion chamber 20 is enabled. A glow plug 24 as a heat generating unit projecting into the combustion chamber 20 is provided in the combustion chamber 20.

If the fuel is injected into the combustion chamber 20, the fuel causes self-ignition due to compression of the combustion chamber 20, and energy is generated. The energy is taken out as rotational energy of an output shaft (crankshaft 26) of the diesel engine 10 through the piston 18. A crank angle sensor 28 for sensing a rotation angle of the crankshaft 26 is provided near the crankshaft 26. A coolant flows through the cylinder block 16 to suppress the temperature increase of the diesel engine 10 due to the combustion of the fuel. A coolant temperature sensor 30 for sensing the temperature of the coolant is provided to the cylinder block 16.

After the fuel is injected into the combustion chamber 20 through the injector 22 and the combustion arises, a gas used in the combustion is discharged to an exhaust passage 32 as exhaust gas through an opening operation of an exhaust valve 31.

The opening and closing drive of both the above-described intake valve 14 and the exhaust valve 31 is performed by the torque of the crankshaft 26. Specifically, a variable valve timing device 36 that varies a rotation phase difference of an intake side camshaft 34 with respect to the crankshaft 26 is provided to the intake valve 14. A cam angle sensor 37 for sensing a rotation angle of the intake side camshaft 34 is provided near the intake side camshaft 34.

An electronic control unit (ECU 40) operates the various actuators such as the injector 22 based on the sensing values of the various sensors sensing the operation states of the diesel engine 10 and requests of a user. Thus, the ECU 40 controls output characteristics (output torque, exhaust characteristic) of the diesel engine 10. Specifically the ECU 40 operates a temperature state of the glow plug 24 through a controller 50. Furthermore, the ECU 40 performs abnormality diagnosis of the glow plug 24 through the controller 50 and outputs the result on a display 45 when the abnormality arises.

Figure 2:
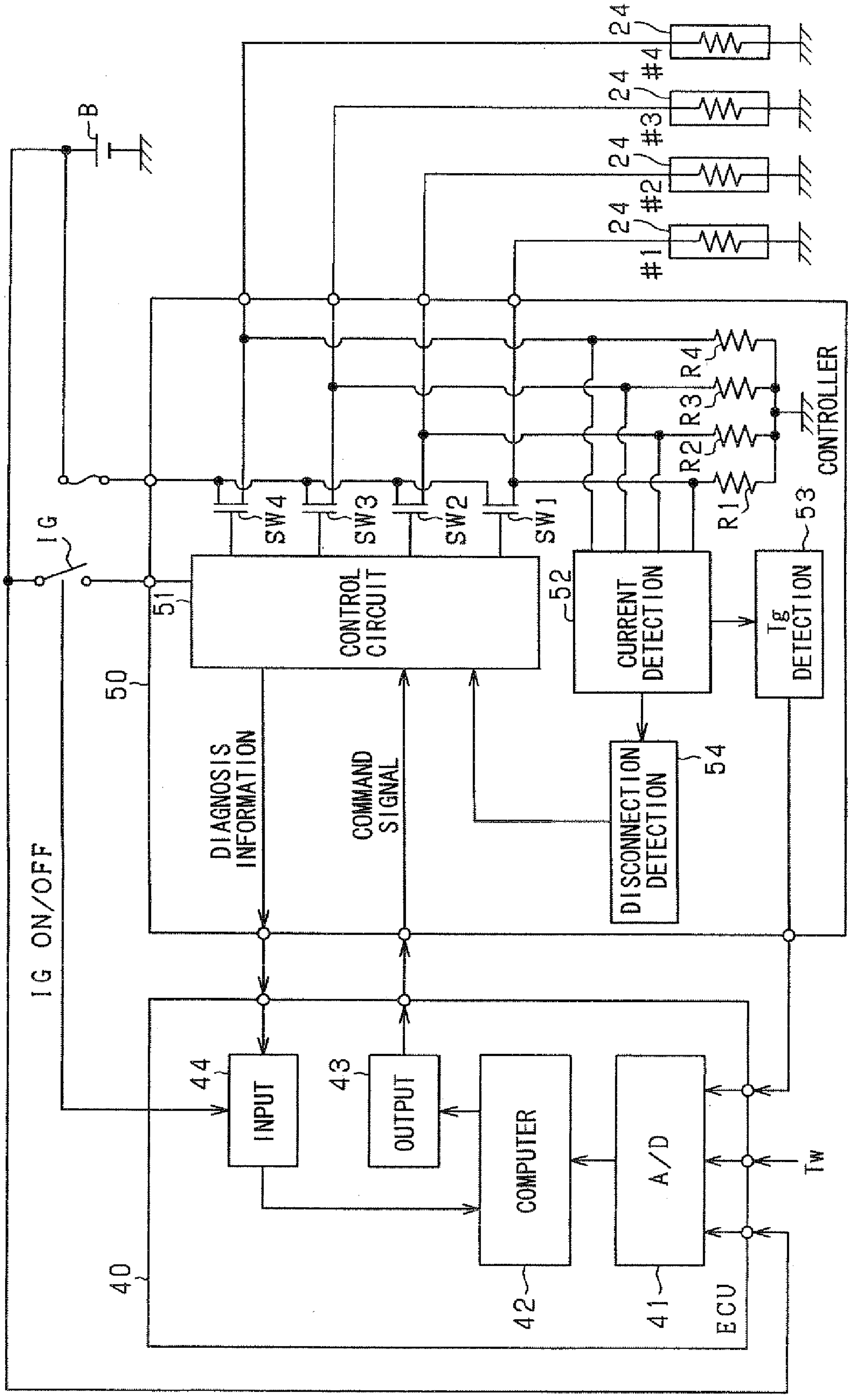
FIG. 2 is a diagram showing a structure of a drive device of a glow plug according to the first embodiment.

FIG. 2 shows structures of the ECU 40 and the controller 50. As shown in FIG. 2, since a four-cylinder engine is assumed as the diesel engine 10 in the present embodiment, four glow plugs 24 for the respective cylinders are provided. The controller 50 has switching elements SW1-SW4 each consisting of a MOS transistor. The switching elements SW1-SW4 provide/intercept conduction between a battery B and the glow plugs 24 respectively. A control circuit 51 is activated when an ignition switch IG is turned on (i.e., brought to an ON state). The control circuit 51 operates each of conduction control terminals (gates) of the switching elements SW1-SW4 based on a command signal from the ECU 40. Thus, the control circuit 51 controls the conduction state of each of the switching elements SW1-SW4.

Resistors R1-R4 are connected to the glow plugs 24 of the respective cylinders in parallel. Quantities of voltage drops due to the resistors R1-R4 are taken into a current detection circuit 52. The current detection circuit 52 detects quantity of current flowing through each glow plug 24 of each cylinder based on the quantity of the voltage drop. These sensing results are outputted to a temperature detection circuit 53 and a disconnection detection circuit 54.

Figure 3:
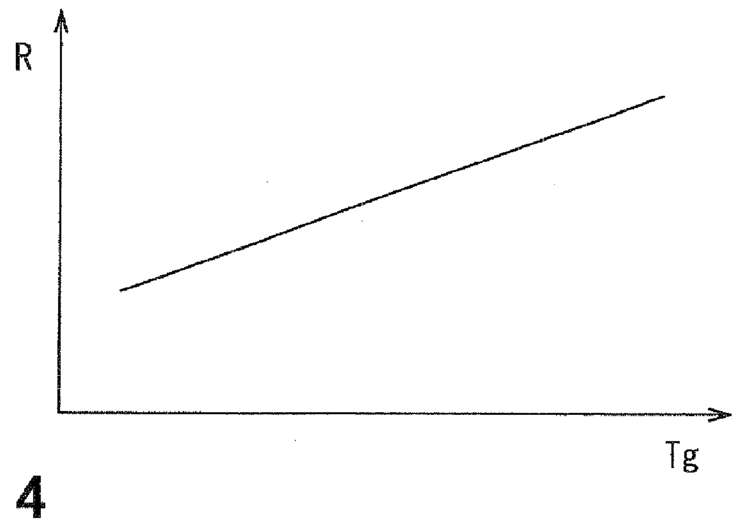
FIG. 3 is a diagram showing an estimating method of temperature of the glow plug according to the first embodiment.

The temperature detection circuit 53 indirectly senses the temperature Tg of the glow plug 24 of each cylinder based on the current which flows through the glow plug 24 of the cylinder. That is, since the resistance R of the glow plug 24 has temperature dependency as shown in FIG. 3, the temperature Tg of the glow plug 24 can be indirectly sensed based on the resistance R. In detail, the resistance R of the glow plug 24 is calculated from the voltage value applied to the glow plug 24 and the current value which flows through the glow plug 24. Then, the temperature Tg of the glow plug 24 is indirectly sensed based on the resistance R. FIG. 3 shows that the resistance R increases with the rise of the temperature Tg of the glow plug 24.

The disconnection detection circuit 54 detects an existence or nonexistence of a disconnection abnormality in a closed loop circuit including the glow plug 24 based on whether the current flows through the glow plug 24 of each cylinder. The detection result of the existence or nonexistence of the disconnection abnormality is outputted to the ECU 40 as diagnostic information through the control circuit 51.

The ECU 40 takes in the signal about the temperature of the glow plug 24, the output signal of the coolant temperature sensor 30, and also the voltage value of the battery B. The ECU 40 changes these into digital data with an A/D converter 41. The digital data outputted by the A/D converter 41 is taken into a microcomputer 42. The microcomputer 42 generates the above-described command signal based on these input data, and outputs the command signal to the controller 50 through an output circuit 43. The diagnostic information outputted by the controller 50 and the state of the ignition switch IG are taken into the microcomputer 42 through an input circuit 44.

Figure 4:
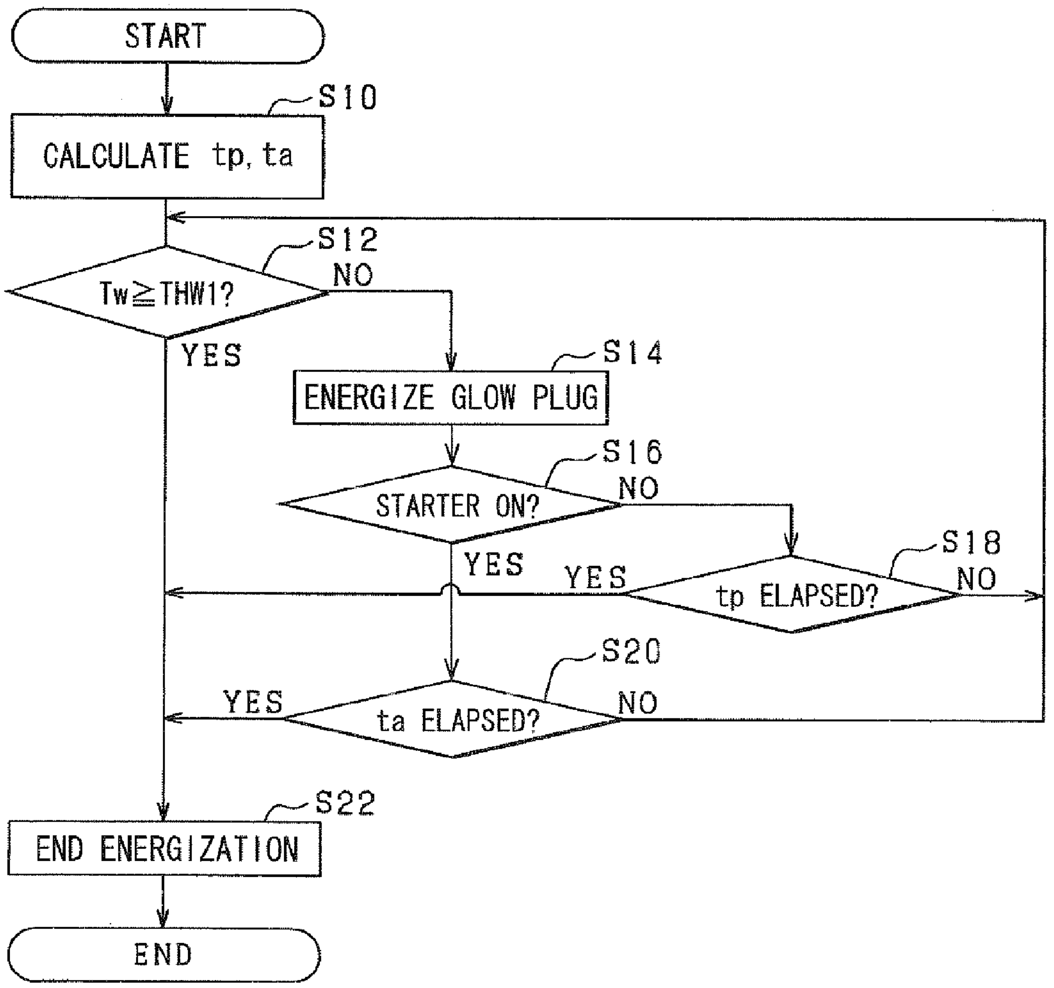
FIG. 4 is a flowchart showing a procedure of energization processing of the glow plug according the first embodiment.
Figure 5:
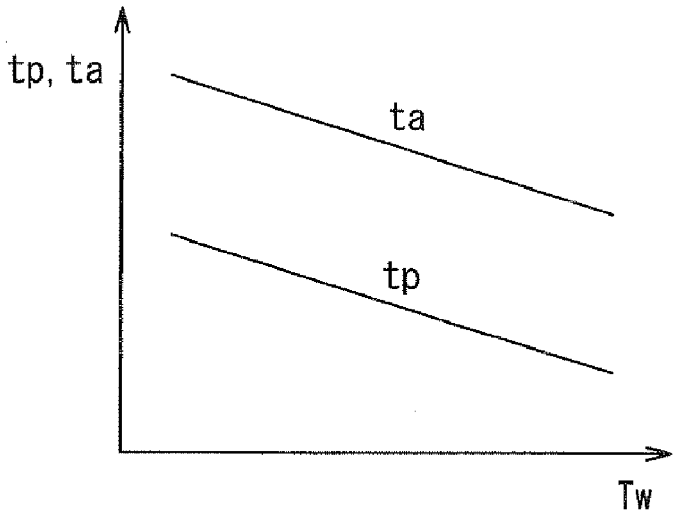
FIG. 5 is a diagram showing a setting method of energization periods of the glow plug according to the first embodiment.

A procedure of the energization processing applied to the glow plug 24 is shown in FIG. 4. This processing is started and performed by the ECU 40 when the ignition switch IG is brought to the ON state. In a series of the processing, first, energization periods tp, ta are calculated in Step S10 based on the coolant temperature Tw sensed by the coolant temperature sensor 30. The energization period tp sets the upper limit period for continuing the energization of the glow plug 24 when the state where the starter is not started continues after the ignition switch IG is set to ON. That is, if the ignition switch IG is set to the ON state, the energization of the glow plug 24 is started to warm up the combustion chamber 20 and to prepare for the starting. However, in some cases, the starter is not started thereafter. In such cases, the energization is stopped from the viewpoint of reduction of power consumption and evasion of overheating of the glow plug 24. The energization period tp sets the upper limit period for this de-energization. The energization period ta defines the energization period after the completion of the starting. That is, it is thought that, after continuing the energization of the glow plug 24 to some extent after the starting, the diesel engine 10 is sufficiently warmed up and suitable ignitability can be maintained even without using the glow plug 24. Thus, the energization period ta sets the period necessary for continuing the energization after the completion of the starting. In detail, these energization periods tp, ta are calculated with a map shown in FIG. 5 that defines the relation with coolant temperature Tw. As shown in FIG. 5, the energization periods tp, ta are set shorter as the coolant temperature Tw increases.

In following Step S12, it is determined whether the coolant temperature Tw is equal to or higher than predetermined temperature THW1. This processing determines whether the energization of the glow plug 24 is necessary or not. That is, since the energization of the glow plug 24 is unnecessary when the temperature of the diesel engine 10 is sufficiently high, the processing determines the necessity for the energization based on the temperature state of the diesel engine 10. The coolant temperature Tw is a parameter that shows the temperature state of the diesel engine 10. The predetermined temperature THW1 defines the boundary of the existence of the necessity of the energization of the glow plug 24.

When it is determined that the coolant temperature Tw is lower than the predetermined temperature THW1 in Step S12, it determines that it is necessary to raise the temperature in the combustion chamber 20 of the diesel engine 10, and the energization process of the glow plug 24 is performed in Step S14. Here, based on the temperature information outputted by the temperature detection circuit 53 shown in FIG. 2, PWM control of the switching elements SW1-SW4 may be performed. Thus, the energization amounts of the glow plugs 24 are operated and the temperature thereof is controlled.

If the energization process of the glow plug 24 is performed in Step S14, the processing shifts to Step S16. In Step S16, it is determined whether the starter (not shown) is in an ON state. As mentioned above, this processing is the setup for stopping the energization process of the glow plug 24 if the starter is not brought to the ON state until the energization period tp elapses after the ignition switch IG is brought to the ON state. When the starter is not in the ON state, in Step S18, it is determined whether the energization period of the glow plug 24, i.e., the energization period starting when the ignition switch IG is brought to the ON state, is equal to or longer than the energization period tp.

When it is determined that the starter is in the ON state in Step S16, the processing shifts to Step S20. In Step S20, it is determined whether the energization period after the completion of the starting is equal to or longer than the energization period ta, after the starter is activated. When Step S18 or Step S20 makes a negative determination, the processing returns to step S12. When Step S12, Step S18 or Step S20 makes affirmative determination, the processing shifts to Step 522. The energization of all the cylinders is ended in Step S22.

Thus, in the present embodiment, the energization is ended when the starter is not started within the energization period tp after the ignition switch IG is brought to the ON state, when the energization period ta elapses after the completion of the starting, or when the coolant temperature Tw becomes equal to or higher than the predetermined temperature THW1.

Figure 6:
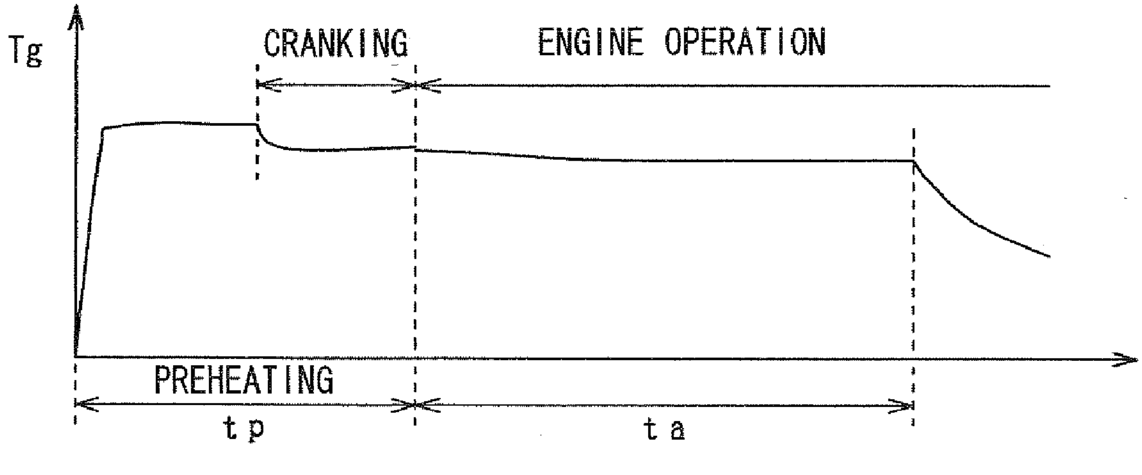
FIG. 6 is a time chart showing a temperature control mode of the glow plug according to the first embodiment.

A mode of the temperature control of the glow plug 24 is shown in FIG. 6. As shown in FIG. 6, when the starting of the diesel engine 10 is performed, the energization of the glow plug 24 is completed when the energization period ta elapses after the completion of the starting, and then, the temperature Tg of the glow plug 24 falls.

When disconnection arises in the closed loop circuit connecting the glow plug 24 and the battery B although the switching elements SW1-SW4 are in the ON states, the inside of the combustion chamber 20 cannot be heated by the glow plug 24. Therefore, when the coolant temperature Tw is lower than the predetermined temperature THW1, lowering of the startability of the diesel engine 10 is a problem.

Figure 7:
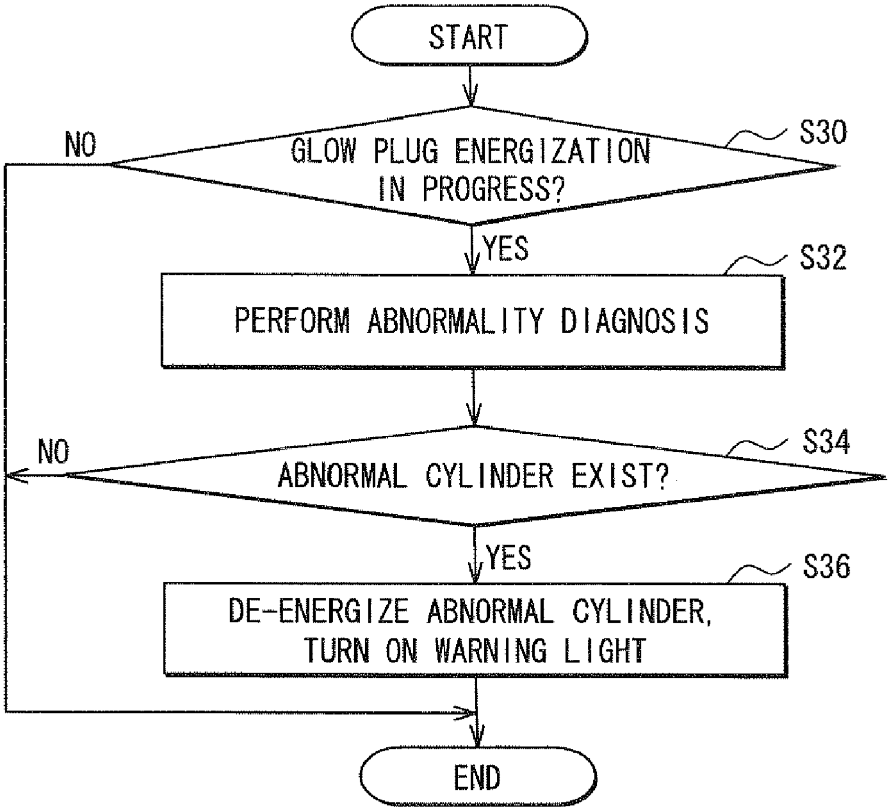
FIG. 7 is a flowchart showing a procedure of abnormality diagnosis processing of the glow plug according to the first embodiment.

Next, processing to cope with this problem will be explained. FIG. 7 shows a procedure of disconnection abnormality diagnosis processing of the glow plug 24 according to the present embodiment. The ECU 40 repeatedly performs the processing, for example, in a predetermined cycle. In a series of the processing, it is first determined in Step S30 whether the energization process of the glow plug 24 is in progress. When S30 is YES, the processing shifts to Step S32. The disconnection abnormality of the glow plug 24 is diagnosed in Step S32. Here, it may be determined that the disconnection occurs when the current flowing through a certain glow plug 24 is equal to or less than a threshold value although a corresponding one of the switching elements SW1-SW4 is in the ON state. The threshold value is set at a value for avoiding erroneously determining that the current flows through the glow plug 24 due to an influence of a noise. In Step S34, it is determined whether there is a cylinder that has an abnormality in the glow plug 24 as a result of the diagnosis of Step S32. When it is determined that there is an abnormal cylinder, the processing shifts to Step S36. In Step S36, the energization of the abnormal cylinder is cut and the abnormality is reported to an outside through the display 45 (e.g., an abnormality lamp is lit). When negative determination is made in Step S30 or Step S34, or when the processing of Step S36 is completed, this series of the processing is ended once.

Figure 8:
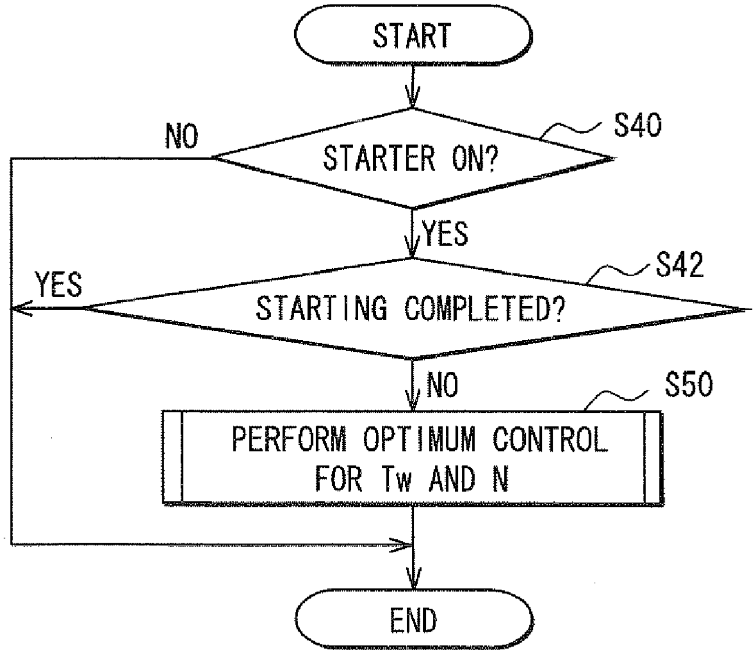
FIG. 8 is a flowchart showing a procedure of starting processing in the case of the abnormality of the glow plug according to the first embodiment.

FIG. 8 shows a procedure of processing in the case of the disconnection abnormality of the glow plug 24 according to the present embodiment. The ECU 40 repeatedly performs the processing, for example, in a predetermined cycle. The series of the processing (Step S50) performs optimum control according to the coolant temperature Tw and the number of the abnormal cylinder(s) to compensate the lowering of the startability due to the disconnection abnormality during a period since the starter is brought to the ON state (Step S40: YES) until the starting is completed (Step S42: YES).

Figure 9:
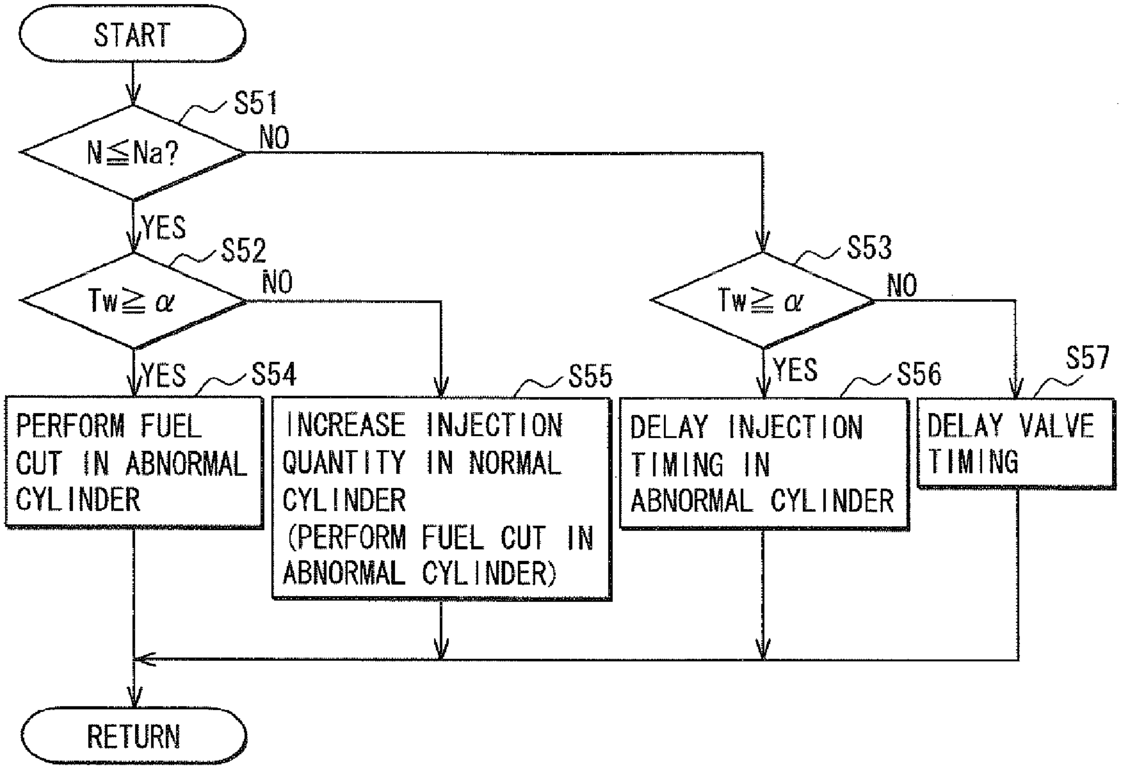
FIG. 9 is a flowchart showing details of the starting processing of FIG. 8.

Details of Step S50 are shown in FIG. 9. Here, following four kinds of processing are selectively performed according to whether the number N of the abnormal cylinder(s) is equal to or less than a predetermined number Na (Step S51) and whether the coolant temperature Tw is equal to or higher than predetermined temperature α (Step S52, S53).

Step S54 is processing performed when the number N of the abnormal cylinder(s) is equal to or less than the predetermined number Na and the coolant temperature Tw is equal to or higher than the predetermined temperature α. In particular, Step S54 performs processing for cutting the fuel injection of the abnormal cylinder. There is a possibility that the temperature in the combustion chamber 20 of the cylinder with the disconnection abnormality of the glow plug 24 is too low to ignite the fuel and the fuel is not used in the combustion in the combustion chamber 20. Even if the fuel is used in the combustion, there is a possibility that incomplete combustion is caused and the black lead is discharged. Therefore, in the present embodiment, useless consumption of the fuel and discharge of the black lead are avoided by stopping the injection. By stopping the injection of the fuel, further cooling of the combustion chamber 20 due to the fuel injection is avoided.

Step S55 is processing performed when the number N of the abnormal cylinder(s) is equal to or less than the predetermined number Na and the coolant temperature Tw is lower than the predetermined temperature α. In particular, Step S55 performs processing for increasing the fuel injection quantity in the normal cylinder. If there is the cylinder with the abnormality in the glow plug 24, the cylinder cannot exert combustion energy. In such the case, there is a possibility that the combustion energy of the diesel engine 10 falls short as a whole. Specifically when the coolant temperature Tw is low, the friction among the piston 18, the inner wall of the cylinder block 16 and the like of the diesel engine 10 increases. Therefore, the combustion energy tends to fall short. Therefore, the fuel injection quantity of the normal cylinder is increased under such a situation. At this time, the fuel injection of the abnormal cylinder should be preferably cut.

Step S56 is processing performed when the number N of the abnormal cylinder(s) is greater than the predetermined number Na and the coolant temperature Tw is equal to or higher than the predetermined temperature α. In particular, processing for delaying the injection timing of the abnormal cylinder is performed. Thus, a compression degree of the gas in the combustion chamber 20 as of the injection increases, so the temperature in the combustion chamber 20 as of the injection can be raised. Thus, the ignitability of the fuel can be increased even in the cylinder with the abnormality in the glow plug 24, so the combustion energy of the abnormal cylinder can be used for the starting. When the number N of the abnormal cylinder(s) is greater than the predetermined number Na, there is a possibility that it becomes difficult to secure the energy necessary for the starting only with the normal cylinder(s). Therefore, in the present embodiment, the ignitability in the abnormal cylinder is improved under such a situation.

Step S57 is processing performed when the number N of the abnormal cylinder(s) is greater than the predetermined number Na and the coolant temperature Tw is lower than the predetermined temperature α. In particular, processing for delaying the valve timing of the intake valve 14 of the abnormal cylinder is performed. More preferably, processing for delaying the valve timing of the intake valves 14 of all the cylinders should be performed. Thus, the compression ratio of the combustion chamber(s) 20 of the abnormal cylinder(s) or the like can be increased, so the temperature in the combustion chamber(s) 20 at the time of the injection can be raised. Thus, the ignitability of the fuel can be increased even in the cylinder with the abnormality in the glow plug 24, so the combustion energy of the abnormal cylinder can be used for the starting. That is, when the number N of the abnormal cylinder(s) is greater than the predetermined number Na, there is a possibility that it becomes difficult to secure the energy necessary for the starting with only the normal cylinder(s). Moreover, when the coolant temperature Tw is lower than the predetermined temperature α, there is a possibility that it becomes difficult to sufficiently improve the ignitability by delaying the injection timing. Therefore, in the present embodiment, the ignitability in the abnormal cylinder(s) is improved by delaying the valve timing under such a situation.

The above-described predetermined number Na is set according to a boundary value, at which the starting can be performed with only the normal cylinder(s). The predetermined temperature α is set lower than above-described predetermined temperature THW1. In the processing shown in FIG. 9, preferably, the processing of Step S54 and S56 should not be performed when the temperature Tw is higher than the predetermined temperature THW1.

The present embodiment described above exerts following effects, for example.

(1) When the abnormality in the glow plug 24 is detected, in order to compensate the lowering of the startability due to the abnormality, the operation mode of the actuator for the power control of the diesel engine 10 is changed on the occasion of the starting of the diesel engine 10. Thus, the lowering of the startability due to the abnormality in the glow plug 24 can be compensated, and the startability can be improved.

(2) The fuel injection of the cylinder in which the abnormality of the glow plug 24 id detected is cut. Thus, useless consumption of the fuel and the discharge of the black lead can be avoided. By cutting the fuel injection, the further temperature decrease in the combustion chamber 20 of the cylinder in which the abnormality is detected can be also avoided.

(3) The correction for increasing the fuel of the cylinder in which the abnormality of the glow plug 24 is not detected is performed. Thus, even if the combustion energy of the fuel is not generated in the abnormal cylinder, the insufficiency in the combustion energy can be compensated with the combustion energy in other cylinder(s).

(4) When there is the abnormality in the glow plug 24, the timing of the fuel injection through the injector 22 in the abnormal cylinder is delayed. Thus, the ignitability of the fuel in the combustion chamber 20 can be improved, and the startability can be improved as a result.

(5) The valve timing of the intake valve 14 is delayed. Thus, the ignitability of the fuel in the combustion chamber 20 of the abnormal cylinder can be improved, and the startability can be improved eventually.

(6) When the number of the abnormal cylinder(s) is greater than the predetermined number, processing for promoting the ignitability of the abnormal cylinder is performed. When the number is equal to or less than the predetermined number, the fuel cut of the abnormal cylinder or the injection quantity increase of the normal cylinder is performed. Thus, more suitable start control can be performed.

(7) If the number of the abnormal cylinder(s) is equal to or less than the predetermined number, the injection quantity increase of the normal cylinder is performed when the coolant temperature is lower than the predetermined temperature α and the fuel injection to the abnormal cylinder is cut when the temperature is equal to or higher than the predetermined temperature α. Thus, further more suitable start control can be performed.

(8) If the number of the abnormal cylinder(s) is greater than the predetermined number, the valve timing of the intake valve 14 is delayed when the coolant temperature is lower than the predetermined temperature α and the injection timing is delayed when the temperature is equal to or higher than the predetermined temperature α. Thus, still more suitable start control can be performed.

Next, a second embodiment of the present invention will be described with reference to the drawings, focusing on the differences from the first embodiment.

Figure 10:
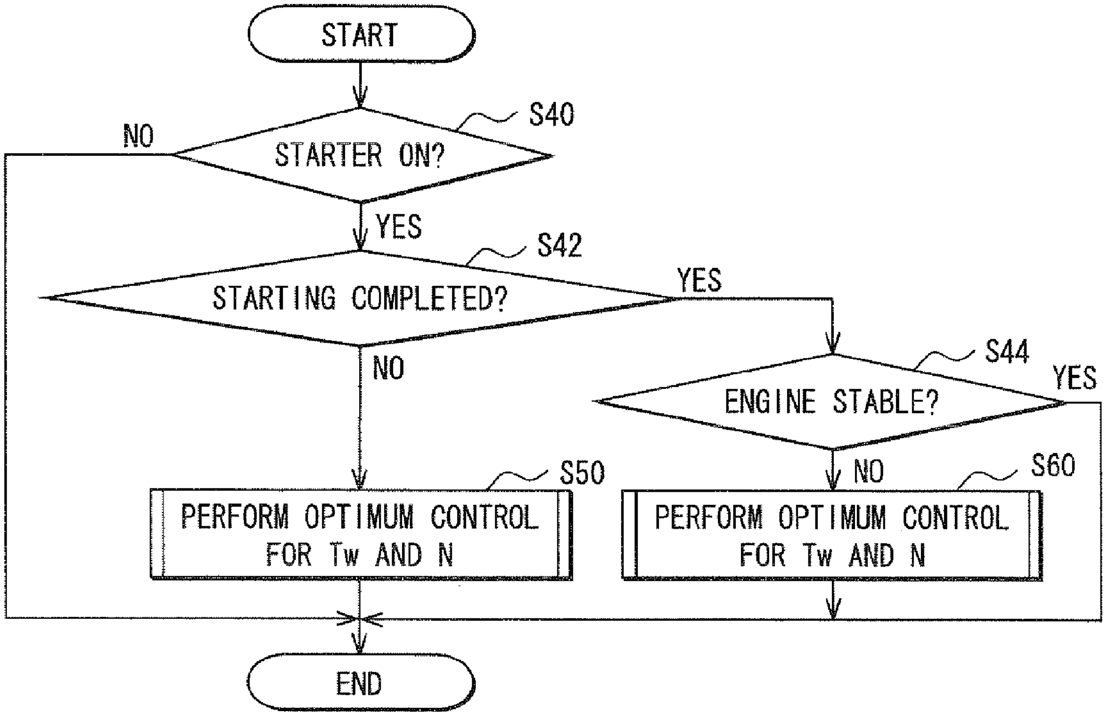
FIG. 10 is a flowchart showing a procedure of processing in the case of an abnormality of a glow plug according to a second embodiment of the present invention.

FIG. 10 shows a procedure of the power control accompanying the starting of the diesel engine 10 according to the present embodiment. The ECU 40 repeatedly performs the processing, for example, in a predetermined cycle. As shown in FIG. 10, in the present embodiment, it is determined whether the operation state of the diesel engine 10 is stabilized after the completion of the starting (Step S44). Whether the operation state of the diesel engine 10 is stabilized may be determined based on whether a rotation fluctuation amount of the crankshaft 26 becomes equal to or lower than a predetermined value, for example. If the diesel engine 10 has a cylinder pressure sensor for sensing the pressure in the combustion chamber 20, the ignition timing may be sensed based on the sensing value and the stability of the operation state (i.e., stability of combustion) may be determined based on the ignition timing. It is thought that the ignitability in the cylinder with the abnormality in the glow plug 24 is low while the operation state of the diesel engine 10 is unstable. Therefore, in the present embodiment, processing of Step S60 is performed under such a situation.

Figure 11:
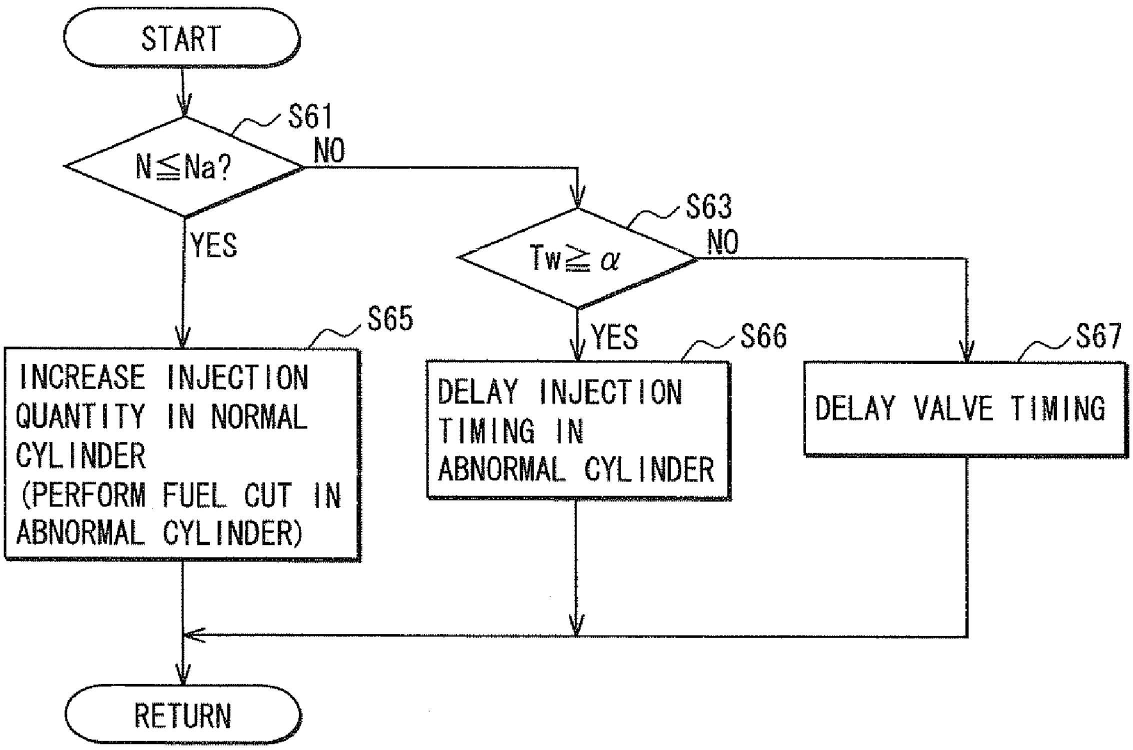
FIG. 11 is a flowchart showing details of the processing of FIG. 10.

FIG. 11 shows the details of the processing of Step S60. As shown in FIG. 11, when the number N of the abnormal cylinder(s) is equal to or less than the predetermined number Na (Step S61: YES), processing for increasing the injection quantity of the normal cylinder is performed in Step S65 like Step S55 of FIG. 9. When the number N of the abnormal cylinder(s) is greater than the predetermined number Na (Step S61: NO), it is determined whether the coolant temperature Tw is equal to or higher than the predetermined temperature α in Step S63. When the coolant temperature Tw is equal to or higher than the predetermined temperature α, the same processing as Step S56 of FIG. 9 is performed in Step S66. When the coolant temperature Tw is lower than the predetermined temperature α, the same processing as Step S57 of FIG. 9 is performed in Step S67.

According to the above-described present embodiment, following effects are further exerted in addition to the effects (1)-(8) of the first embodiment.

(9) The operation mode of the actuator of the diesel engine 10 is changed to compensate the instability of the operation state of the diesel engine 10 due to the abnormality in the glow plug 24 after the completion of the starting of the diesel engine 10. Thus, the instability due to the abnormality can be inhibited or avoided suitably.

(10) The correction for increasing the fuel of the cylinder, in which no abnormality is detected, is performed to stabilize the operation state of the diesel engine 10 after the completion of the starting. Thus, the shortage of the combustion energy can be suitably inhibited or averted.

(11) The timing of the fuel injection through the injector 22 is delayed to stabilize the operation state of the diesel engine 10 after the completion of the starting. Thus, the ignitability of the fuel in the combustion chamber 20 can be improved.

(12) The valve timing of the intake valve 14 is delayed to stabilize the operation state of the diesel engine 10 after the completion of the starting. Thus, the ignitability of the fuel in the combustion chamber 20 can be improved.

(13) The control for stabilizing the operation state is switched according to whether the number of the abnormal cylinder(s) is equal to or less than the predetermined number and according to whether the coolant temperature is equal to or higher than the predetermined temperature α. Thus, the operation state of the diesel engine 10 can be stabilized more appropriately.

The above-described embodiments may be modified as follows for example.

In the above-described first or second embodiment, the four kinds of processing in Steps S54 to S57 of FIG. 9 may be used together as processing from the starter ON state to the completion of the starting. That is, for example, according to the situation, the processing for delaying the valve timing may be used in combination with the processing for increasing the fuel injection quantity of the normal cylinder. For example, according to the situation, the processing for delaying the injection timing of the abnormal cylinder may be used in combination with the processing for increasing the fuel injection quantity of the normal cylinder. For example, according to the situation, the processing for delaying the injection timing of the abnormal cylinder may be used in combination with the processing for delaying the valve timing of the abnormal cylinder. Moreover, for example, according to the situation, the processing for delaying the injection timing of the abnormal cylinder, the processing for delaying the valve timing of the abnormal cylinder and the processing for increasing the injection quantity of the normal cylinder may be used in combination.

In the above-described second embodiment, the three kinds of the processing in Steps S65 to S67 of FIG. 11 may be used together as processing since the starting is completed until the operation state is stabilized. That is, for example, according to the situation, the processing for delaying the valve timing may be used in combination with the processing for increasing the fuel injection quantity of the normal cylinder. For example, according to the situation, the processing for delaying the injection timing of the abnormal cylinder may be used in combination with the processing for increasing the fuel injection quantity of the normal cylinder. For example, according to the situation, the processing for delaying the injection timing of the abnormal cylinder may be used in combination with the processing for delaying the valve timing of the abnormal cylinder. Moreover, for example, according to the situation, the processing for delaying the injection timing of the abnormal cylinder the processing for delaying the valve timing of the abnormal cylinder and the processing for increasing the injection quantity of the normal cylinder may be used in combination.

The parameter for grasping the temperature state of the diesel engine 10 is not limited to the coolant temperature. For example, temperature of engine oil circulating through the diesel engine 10 may be used.

The scheme for increasing the temperature in the combustion chamber 20 is not limited to the above-mentioned scheme. For example, the temperature in the combustion chamber 20 may be increased by reducing the air quantity flowing into the combustion chamber 20 compared with the case where the air quantity is not reduced.

The valve characteristic varying device is not limited to the variable valve timing device 36 mentioned above. For example, a device for varying a lift amount of the valve may be used. Also in this case, the compression ratio can be increased by changing the valve characteristic, so the ignitability can be improved.

In the above-described embodiments, the processing suitably selected from multiple types of processing according to the situation is used as the processing for compensating the lowering of the startability or the instability of the operation state in the case of the abnormality of the glow plug 24. However, the invention is not limited to this. For example, useless fuel consumption can be avoided by cutting the fuel injection of the abnormal cylinder when the disconnection abnormality of the glow plug 24 is detected. For example, the shortage of the combustion energy can be compensated by increasing the fuel injection quantity of the normal cylinder when the disconnection abnormality of the glow plug 24 is detected. For example, the ignitability of the abnormal cylinder can be improved by delaying the injection timing when the disconnection abnormality of the glow plug 24 is detected. Furthermore, for example, the ignitability of the abnormal cylinder can be improved by delaying the valve timing when the disconnection abnormality of the glow plug 24 is detected.

The changing scheme for changing the operation mode of the actuator of the diesel engine 10 to control the state quantity in the combustion chamber 20 of the diesel engine 10 such that the lowering of the startability due to the disconnection abnormality of the glow plug 24 is compensated is not limited to the scheme illustrated in each of the above-described embodiments. For example, output torque may be increased by advancing the injection timing of the normal cylinder.

The acquisition method of the temperature information of the glow plug 24 is not limited to the method illustrated in each of the above-described embodiments. For example, the temperature of the glow plug 24 may be directly measured using a temperature sensor. The diagnosis method of the disconnection abnormality of the glow plug 24 is not limited to the method illustrated in each of the above-described embodiments. For example, the method described in Patent Document 1 may be used.

The diesel engine is not limited to the four-cylinder engine. The ignitability of the fuel becomes problematic specifically when the starting is performed in a low-temperature state not only in the diesel engine but also in a compression ignition type internal combustion engine. The compression ignition type internal combustion engine ignites the fuel, which is injected into the combustion chamber, by compression. Therefore, the present invention is specifically effective for the compression ignition type internal combustion engine. Not only in the case of the compression ignition type internal combustion engine but also in the case of a spark ignition type internal combustion engine such as a gasoline engine, if the engine has a heat generating unit projecting into the combustion chamber for compensating the lowering of the ignitability of fuel as of the starting in the low-temperature state, the application of the present invention is effective in the case of the abnormality of the heat generating unit.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A controller of an internal combustion engine having a heat generating unit projecting into a combustion chamber of the engine, the controller controlling an output of the engine and comprising:

- an abnormality detecting means for detecting an abnormality in the heat generating unit;
- a changing means for changing an operation mode of an actuator of the engine to control a state quantity in the combustion chamber of the engine such that lowering of startability due to the abnormality is compensated and such that the startability is improved on the occasion of starting of the engine if the abnormality in the heat generating unit is detected; and
- a valve characteristic varying means for varying a valve characteristic of an intake valve as the actuator, wherein the changing means includes a temperature raising means for raising temperature in the combustion chamber of the engine through an operation of the actuator of the engine, and the temperature raising means includes a compression ratio increasing means for increasing a compression ratio by operating the valve characteristic varying means.

2. The controller as in claim 1, wherein the engine is a multi-cylinder internal combustion engine, and the changing means includes a cutting means for cutting fuel supply of the cylinder in which the abnormality is detected.

3. The controller as in claim 1, wherein the engine is a multi-cylinder internal combustion engine, and the changing means includes an increase correction performing means for performing increase correction of fuel supply of the cylinder in which the abnormality is not detected.

4. The controller as in claim 1, wherein the temperature raising means includes a delaying means for delaying timing of fuel injection performed with an injector as the actuator.

5. The controller as in claim 1, wherein the engine is a multi-cylinder internal combustion engine, the changing means raises the temperature in the combustion chamber of the cylinder having the abnormality with the use of the temperature raising means when the number of the cylinder or cylinders having the abnormality is greater than a predetermined number.

6. The controller as in claim 5, wherein the changing means includes a cutting means for cutting fuel supply of the cylinder in which the abnormality is detected and an increase correction performing means for performing increase correction of the fuel supply of the cylinder in which the abnormality is not detected, the changing means uses the increase correction performing means when the number of the abnormal cylinder or cylinders is equal to or less than the predetermined number and temperature of the engine is lower than predetermined temperature, and the changing means uses the cutting means when the number of the abnormal cylinder or cylinders is equal to or less than the predetermined number and the temperature of the engine is equal to or higher than the predetermined temperature.

7. The controller as in claim 5, wherein the temperature raising means has a delaying means for delaying timing of fuel injection performed through an injector as the actuator, the temperature raising means uses the compression ratio increasing means when temperature of the engine is lower than predetermined temperature, and the temperature raising means uses the delaying means when the temperature of the engine is equal to or higher than the predetermined temperature.

8. The controller as in claim 1, further comprising:

a stabilizing means for changing the operation mode of the actuator of the engine to control the state quantity in the combustion chamber of the engine such that instability of an operation state of the engine due to the abnormality is compensated after the starting of the engine is completed.

9. The controller as in claim 8, wherein the engine is a multi-cylinder internal combustion engine, and the stabilizing means includes an increase correction performing means for performing increase correction of fuel supply of the cylinder in which the abnormality is not detected.

10. The controller as in claim 8, wherein the stabilizing means includes a temperature raising means for raising temperature in the combustion chamber of the engine through an operation of the actuator of the engine.

11. The controller as in claim 10, wherein the temperature raising means of the stabilizing means includes a delaying means for delaying timing of fuel injection performed through an injector as the actuator.

12. The controller as in claim 11, further comprising:

the temperature raising means of the stabilizing means includes a compression ratio increasing means for increasing a compression ratio by operating the valve characteristic varying means.

13. A controller of an internal combustion engine having a heat generating unit projecting into a combustion chamber of the engine, the controller controlling an output of the engine and comprising:

an abnormality detecting means for detecting an abnormality in the heat generating unit;

a changing means for changing an operation mode of an actuator of the engine to control a state quantity in the combustion chamber of the engine such that lowering of startability due to the abnormality is compensated and such that the startability is improved on the occasion of starting of the engine if the abnormality in the heat generating unit is detected;

a stabilizing means for changing the operation mode of the actuator of the engine to control the state quantity in the combustion chamber of the engine such that instability of an operation state of the engine due to the abnormality is compensated after the starting of the engine is completed; and a valve characteristic varying means for varying a valve characteristic of an intake valve as the actuator, wherein the stabilizing means includes a temperature raising means for raising temperature in the combustion chamber of the engine through an operation of the actuator of the engine;

the temperature raising means includes a delaying means for delaying timing of fuel injection performed through an injector as the actuator; and the temperature raising means includes a compression ratio increasing means for increasing a compression ratio by operating the valve characteristic varying means.

14. The controller as in claim 13, wherein the engine is a multi-cylinder internal combustion engine, and the changing means includes a cutting means for cutting fuel supply of the cylinder in which the abnormality is detected.

15. The controller as in claim 13, wherein the engine is a multi-cylinder internal combustion engine, and the changing means includes an increase correction performing means for performing increase correction of fuel supply of the cylinder in which the abnormality is not detected.

16. The controller as in claim 13, wherein the changing means includes a temperature raising means for raising temperature in the combustion chamber of the engine through an operation of the actuator of the engine.

17. The controller as in claim 16, wherein the temperature raising means of the changing means includes a delaying means for delaying timing of fuel injection performed with an injector as the actuator.

18. The controller as in claim 16, wherein the temperature raising means of the changing means includes a compression ratio increasing means for increasing a compression ratio by operating the valve characteristic varying means.

19. The controller as in claim 13, wherein the engine is a multi-cylinder internal combustion engine, the changing means includes a temperature raising means for raising temperature in the combustion chamber of the engine through an operation of the actuator of the engine, and the changing means raises the temperature in the combustion chamber of the cylinder having the abnormality with the use of the temperature raising means when the number of the cylinder or cylinders having the abnormality is greater than a predetermined number.

20. The controller as in claim 19, wherein the changing means includes a cutting means for cutting fuel supply of the cylinder in which the abnormality is detected and an increase correction performing means for performing increase correction of the fuel supply of the cylinder in which the abnormality is not detected, the changing means uses the increase correction performing means when the number of the abnormal cylinder or cylinders is equal to or less than the predetermined number and temperature of the engine is lower than predetermined temperature, and the changing means uses the cutting means when the number of the abnormal cylinder or cylinders is equal to or less than the predetermined number and the temperature of the engine is equal to or higher than the predetermined temperature.

21. The controller as in claim 19, wherein the temperature raising has a delaying means for delaying timing of fuel injection performed through an injector as the actuator, the temperature raising means uses the compression ratio increasing means when temperature of the engine is lower than predetermined temperature, and the temperature raising means uses the delaying means when the temperature of the engine is equal to or higher than the predetermined temperature.

22. The controller as in claim 13, wherein the engine is a multi-cylinder internal combustion engine, and the stabilizing means includes an increase correction performing means for performing increase correction of fuel supply of the cylinder in which the abnormality is not detected.

23. A controller of a multi-cylinder internal combustion engine having a heat generating unit projecting into a combustion chamber of the engine, the controller controlling an output of the engine and comprising:

an abnormality determining means for determining an existence of an abnormality in the heat generating unit; and a temperature raising means for raising temperature in the combustion chamber of the engine through an operation of an actuator of the engine on the occasion of starting of the engine if the existence of the abnormality in the heat generating unit is determined;

a valve characteristic varying means for varying a valve characteristic of an intake valve as the actuator, wherein the temperature raising means includes a compression ratio increasing means for increasing a compression ratio by operating the valve characteristic varying means.

24. The controller as in claim 23, wherein the temperature raising means includes a delaying means for delaying timing of fuel injection performed through an injector as the actuator.

* * * * *